(12) United States Patent
Xiao (10) Patent No.: US 9,713,029 B2
(45) Date of Patent: Jul. 18, 2017

(54) QOE OPTIMIZATION IN WIRELESS NETWORKS

(71) Applicant: FUJITSU LIMITED, Kawasaki-shi, Kanagawa (JP)

(72) Inventor: Hui Xiao, West Drayton Middlesex (GB)

(73) Assignee: FUJITSU LIMITED, Kawasaki (JP)

(*) Notice: Subject to any disclaimer, the term of this patent is extended or adjusted under 35 U.S.C. 154(b) by 564 days.

(21) Appl. No.: 14/196,713

(22) Filed: Mar. 4, 2014

(65) Prior Publication Data
US 2014/0293795 A1    Oct. 2, 2014

(30) Foreign Application Priority Data
Mar. 27, 2013   (EP) ..................................... 13161456

(51) Int. Cl.
   H04W 28/02    (2009.01)
   H04W 36/22    (2009.01)
   H04W 88/12    (2009.01)

(52) U.S. Cl.
   CPC ....... H04W 28/0215 (2013.01); H04W 36/22 (2013.01); *H04W 88/12* (2013.01)

(58) Field of Classification Search
None
See application file for complete search history.

(56) References Cited

U.S. PATENT DOCUMENTS

| | | |
|---|---|---|
| 2004/0001467 A1 | 1/2004 | Cromer et al. |
| 2008/0085723 A1 | 4/2008 | Tsa et al. |
| 2008/0096575 A1* | 4/2008 | Aragon ............... H04W 36/22 455/453 |
| 2011/0075556 A1 | 3/2011 | Li |

(Continued)

OTHER PUBLICATIONS

European Seach Report, European patent Application No. 13161456.2 dated Sep. 27, 2013.

(Continued)

*Primary Examiner* — Hicham Foud
*Assistant Examiner* — Saba Tsegaye
(74) *Attorney, Agent, or Firm* — Arent Fox LLP (57) ABSTRACT

A load balancing method in a WLAN having access points (20, 21, 22) each providing service to terminals (10, 11, 12) which are within range of the access points and associated with the access points, the method comprising identifying (S10, S12) overloaded access points, unsatisfied terminals and under-loaded access points; determining (S14), for each overloaded access point, how many M among N unsatisfied terminals associated with the access point, where N>=M>=1, need to re-associate with an under-loaded access point in order to satisfy all the unsatisfied terminals associated with the access point; constructing (S16), for each overloaded access point, one or more sets of M unsatisfied terminals; and finding (S18-S38), for each overloaded access point and each set of M unsatisfied terminals, an under-loaded access point with which every terminal in the set of M can be re-associated in order to satisfy all the N (Continued)

unsatisfied terminals associated with the overloaded access point. The load balancing method may be carried out by a LB Server (30) applied to an enterprise-wide WLAN.

12 Claims, 6 Drawing Sheets

(56) References Cited

U.S. PATENT DOCUMENTS

| | | | |
|---|---|---|---|
| 2011/0130149 A1* | 6/2011 | Yao .................. | H04W 48/12 455/453 |
| 2012/0106346 A1* | 5/2012 | Aguirre ............. | H04W 28/08 370/237 |
| 2012/0230193 A1* | 9/2012 | Fang .................. | H04W 12/06 370/235 |
| 2014/0162664 A1* | 6/2014 | Stapleton ........... | H04W 24/02 455/445 |

OTHER PUBLICATIONS

Ze'Ev Roth et al., "Vision and Architecture Supporting Wireless GBit/sec/km2 Capacity Density Deployments", Future Network & MobileSummit 2010 Conference Proceedings, 2010. pp. 1-7.

\* cited by examiner

QOE OPTIMIZATION IN WIRELESS NETWORKS

CROSS-REFERENCE TO RELATED APPLICATIONS

This application claims priority to European Patent Application No. 13161456.2, filed Mar. 27, 2013. The disclosure of the priority application is incorporated in its entirety herein by reference.

FIELD OF THE INVENTION

The present invention relates to wireless networks and more particularly, but not necessary exclusively, to wireless local area networks or WLANs including WLANs capable of operating in accordance with IEEE802.11 standards.

BACKGROUND OF THE INVENTION

As the popularity of smart phones and data oriented applications continues its rise, mobile network are facing difficulties in meeting fast growing traffic demand. In the near future it is expected that a significant proportion of population of the world's greatest cities will require mobile broadband services at megabit rates, and it has been conservatively calculated that this will require capacity densities of at least 1 Gbps/km$^2$, and very probably 10 Gbps/km$^2$. This is several orders of magnitude greater than that provided by existing network infrastructure, even if the most recent 4G proposals are employed. While some further spectrum may be available for this application, it is inevitable that the majority of required increase for capacity will have to be provided by reducing cell sizes, continuing the trend of the past two decades.

Since the introduction of the first IEEE802.11 standard in 1997, WLANs have become ubiquitous in homes, offices, airports and other public places as a way for wireless devices to access the Internet or a company Intranet. Although the IEEE802.11 group of standards is not the only standard applicable to WLANs, it is the pre-eminent standard and therefore, in the remainder of this specification, the term "WLAN" is to be understood as referring primarily to IEEE802.11, without excluding other standards defining wireless networks operating on similar lines.

There are essentially two types of WLAN topology: the ad-hoc network in which wireless devices communicate with each other without involving any central access points or any connection to a wired network, and, an infrastructure wireless network (of more relevance to the invention to be described) in which one or more access points (APs), connected to a (wired) backhaul network such as broadband Internet, provide a bridge to a number of wireless devices in wireless communication with the APs. The AP is thus the nearest equivalent to a base station in a wireless cellular telephone system. The coverage area provided by one AP is referred to as a "hotspot". Although each hotspot has typically a size of only tens of metres, a larger area can be covered by using multiple geographically-overlapping APs. The hotspots may thus be regarded as cells and the WLAN may form a Small Cell Network (SCN). As in a cellular telephone system, handovers of mobile wireless devices from one AP to another are possible as the wireless devices move between APs. When a wireless device connects to a given AP it "associates" with that AP and starts a "session" for communication with that AP, thereby providing services to a user. Quality of Service, QoS, of those services provided by the operator in turn determines the Quality of Experience, QoE, perceived by the user.

Conventionally, therefore, the wireless device (also referred to as a terminal, client or UE) decides which AP to associate with, and this association is maintained for the duration of a session between the wireless device and AP, until the wireless link is terminated in some way, for example by the wireless device moving out of range of the AP. This causes a handover to another AP: the wireless device detects that a different AP would provide a better signal strength than the AP with which the wireless device is currently associated, so the wireless device "re-associates" with the new AP. The re-association process is basically the same as for association, except that if the new AP uses a different channel from the previous AP then the wireless device will need to retune its radio accordingly.

Small cell networks (SCN) cover a range of radio networks that can be generally classified into two categories based on whether or not the network is managed by operators. For example the low-power micro, pico and femto cells of a 3G or LTE-based wireless communication system are regarded as operator-managed SCN, and Wi-Fi networks (WLANs) can be regarded as non operator-managed SCN. These SCN are all based on the idea of deploying BSs much smaller than the traditional macro cell devices to offer extended coverage (to indoor area or coverage hole areas of the existing macro cells) or support high capacity demand in high-traffic areas.

Both the operator-managed SCN and Wi-Fi SCN have their own advantages. It is expected that, in the future, Wi-Fi SCN will remain a complementary tool to mobile networks but without replacing mobile networks. Although Wi-Fi will not have any performance guarantee, it plays a huge role in offloading network traffic because it has a low cost-per-bit by using license-exempt spectrum and sufficient spectrum to support high throughput rates to subscribers. In this way, WLANs may make a major contribution to a user's QoE.

The subscriber devices (UEs) may be of various types including laptop PCs, tablet computers, or mobile handsets. At least some of these client devices may be multi-RAT devices, capable of wireless communication in accordance with other radio access technologies (RATs) apart from Wi-Fi, in particular wireless cellular technologies such as 3G or LTE.

However, currently with the typical configuration of UEs that can support multimode RATs, they automatically select Wi-Fi access points (APs) for data traffic transmission once they are under the coverage of home or enterprise wireless local area. Moreover as already mentioned, UEs select which AP to associate with using only locally available information and most of them use signal strength as the dominant factor in selecting an AP. This can result in some RATs and APs becoming more congested than others, which will cause degradation in QoE. For example, when a lot of UEs congregate in a conference room, they all tend to select the same Wi-Fi AP even when multiple APs operating on different channels are available. Therefore, in order to ease the traffic congestion and improve the QoE in this kind of scenario, techniques are needed to efficiently manage the association of UEs with different APs using the same or different RATs, including different versions of IEEE802.11 as well as 3G and 4G RATs.

SUMMARY OF THE INVENTION

According to a first aspect of the present invention, there is provided a load balancing method in a wireless network having a plurality of access points each providing service to terminals within range of the access points and associated with the access points, the method comprising:

(a) identifying overloaded access points, unsatisfied terminals and under-loaded access points by
  (ai) identifying an access point as overloaded if the access point fails to satisfy service demands of one or more of its associated terminals;
  (aii) identifying a terminal associated with a overloaded access point as unsatisfied if its service demand is not being satisfied; and
  (aiii) identifying an access point as an under-loaded access point if it can provide service to one or more additional terminals;
(b) determining, for each overloaded access point, how many M among N unsatisfied terminals associated with the access point, where M, N are integers, N>=M>=1, need to re-associate with an under-loaded access point in order to satisfy all the unsatisfied terminals associated with the access point;
(c) constructing, for each overloaded access point, one or more sets of M unsatisfied terminals; and
(d) finding, for each overloaded access point and each set of M unsatisfied terminals constructed in (c), an under-loaded access point with which every terminal in the set of M can be re-associated in order to satisfy all the N unsatisfied terminals associated with the overloaded access point.

Here, the term "terminal" refers to any wireless device capable of acting as a client, user equipment (UE) or station in a wireless network in accordance with a given RAT, regardless of any multi-RAT capabilities which the device may have. The terms "client", "UE" and "terminal" are interchangeable unless the context demands otherwise.

The term "access point", includes for example Wi-Fi APs but may also include other forms of wireless network access point, whether provided as a distinct unit or as one function of a multifunctional device such as a base station.

The term "wireless network" covers both non-operator managed networks such as WLANs, and operator-managed networks.

"Service demand" refers to desired data throughput on a downlink and/or uplink between the terminal and the AP, needed to provide a given service to the terminal. Multiple services may be provided to the same terminal, any of which services may be associated with a certain QoS requirement to maintain a predetermined data throughput. Thus, a terminal is "satisfied" if its desired data throughput including any QoS requirement is being met by the AP with which it is currently associated.

It will be noted that whilst the determining in (b) includes the possibility of determining a single terminal which is unsatisfied and to be re-associated with a different AP, more generally there is a number M terminals to be re-associated out of N unsatisfied terminals where N is typically larger than M. In other words by transferring a subset of the unsatisfied terminals to another AP, it may be possible to bring all the unsatisfied terminals into a satisfied condition.

Moreover, in (c) above, the sets of M unsatisfied terminals can be considered as all possible combinations of M out of the N unsatisfied terminals, with overlapping membership permitted among the respective sets.

Additionally, (d) may further comprise finding candidate access points for re-association by:
  (di) checking, for each set constructed in (c) and for each under-loaded access point, whether every terminal in the set of M unsatisfied terminals is within range of the under-loaded access point, and
  (dii) checking whether the under-loaded access point has sufficient capacity to satisfy every terminal in the set of M;
  and if both checks are positive, marking the under-loaded access point as a candidate access point.

It will be noted from the above preferable feature that an under-loaded access point is only marked as candidate access point if the same under-loaded access point is both within range of all M terminals in the set, and has sufficient capacity to satisfy all M terminals if re-associated to that AP.

Thus, whilst (d) above refers to "an under-loaded access point" it is possible that multiple candidate access points are found for the same set of M unsatisfied terminals, from which one target access point is selected in the following manner.

That is, the method may further comprise:
  (ei) for each set constructed in (c), if there is only one candidate access point for that set, selecting that candidate access point as a target access point for re-association, or if there is more than one candidate access point for that set, selecting, as a target access point for that set, the candidate access point of highest signal strength for the terminals in the set; and
  (eii) if there is only one set constructed in (c), re-associating that set with its target access point, or if there is more than one set constructed in (c), re-associating with its target access point the set having highest signal strength from its target access point.

In this way, it is possible to decide between multiple candidate access points and between multiple sets for which re-association would be possible. Additionally to the above, the load balancing method may further comprise:
  (eiii) if there is more than one set of M unsatisfied terminals with equal highest signal strength in (eii), ranking those sets in descending order of N and if there is one set of largest N, re-associating that set with its target access point.

In each case, "signal strength" means the average signal strength measured at the terminals in the set.

Further optional measures in (e) above, to choose among multiple sets of unsatisfied terminals include:
  (eiv) if there is more than one set of largest N in (eiii), ranking those sets in descending order of efficiency ratio N/M, and if there is one set of highest efficiency ratio, re-associating that set with its target access point; and/or
  (ev) if there is more than one set of equal efficiency ratio in (eiv), ranking those sets in ascending order of capacity required by the M unsatisfied terminals which need to re-associate; and re-associating with its target access point the set of least capacity required.

In the above manner, it is possible to optimise the re-association of terminals in terms of signal strength, efficiency ratio, and/or capacity requirements. The order of importance of these factors is not essential and may be varied.

Preferably, the method is repeated at intervals; in other words iterations of the method are performed periodically during operation of the network.

Alternatively, or in addition, an iteration of the method is triggered by detecting that more than a threshold number of access points are failing to satisfy service demands of associated terminals, and/or that service demands of more than a threshold number of terminals are not being satisfied.

As already mentioned, (d) is repeated for each overloaded access point. Preferably, an overloaded access point is excluded from further consideration in the current iteration of the method if no under-loaded access point can be found in (d). However, it may be possible to deal with this AP in a later iteration of the method.

The above load balancing method is preferably carried out by a Load Balancing Server connected to the network.

Thus, according to a second aspect of the present invention, there is provided a load balancing server connected to a plurality of access points of a wireless network, the access points providing service to terminals within range of, and associated with, the access points, the server arranged to:
  receive information regarding loading of the access points, associations between the access points and the terminals, target data rates of the terminals based on service demands of the terminals, actual data rates of the terminals, and signal strengths of the terminals with respect to access points within range;
  based on the received information, identify access points which fail to satisfy service demands of one or more of associated terminals as overloaded, access points which can provide service to one or more additional terminals as under-loaded, terminals whose service demands are not being met as unsatisfied, and terminals whose service demands are being met as satisfied;
  determine, for each overloaded access point, how many M among N unsatisfied terminals associated with the access point, where $N>=M>=1$, need to re-associate with an under-loaded access point in order that all N terminals are satisfied;
  find, for each possible set of M among the N unsatisfied terminals, an under-loaded access point with which every terminal in the set of M can be re-associated in order to satisfy all the N terminals; and
  instruct the M terminals to re-associate from the overloaded access point to the found under-loaded access point.

The above Load Balancing Server is preferably arranged to obtain at least some of the received information from terminals in the network, as explained below with respect to fifth and sixth aspects of the invention.

According to a third aspect of the present invention, there is provided a computer connected to access points of a wireless network and programmed to provide a load balancing server by performing any method as defined above. Such a load balancing server may be used to control an enterprise-wide WLAN for example.

According to a fourth aspect of the present invention, there is provided computer-readable code which, when executed by a processor of a computer connected to access points of a wireless network, causes the computer to perform any of the methods defined above.

The code may be stored on one or more non-transitive computer-readable recording media.

According to a fifth aspect of the present invention, there is provided a terminal for wireless communication with access points in a wireless network, configured, when associated with a first access point of the wireless network, to accept from a LB Server an instruction to re-associate with a second access point of the wireless network.

Preferably the terminal is further configured to provide to the LB Server with information indicative of one or more of:
  an actual data rate of the terminal;
  details of its association with the first access point; and
  signal strengths at the terminal from various access points within range of the terminal.

According to a sixth aspect of the invention, there is provided computer-readable code which, when executed by a processor of a terminal connected to a first access point in a wireless network, causes the terminal to provide a load-balancing, LB, server with information indicative of one or more of an actual data rate of the terminal, details of its association with the first access point, and signal strengths at the terminal from various access points within range of the terminal; and to accept from the LB Server an instruction to re-associate with a second access point of the wireless network. This code may take the form of a software application ("app") which users install on their terminals.

According to a seventh aspect of the present invention there is provided a wireless communication system comprising a plurality of terminals; a plurality of access points providing service to terminals within range of, and associated with, the access points; and a load balancing server connected to the access points, the server arranged to:
  receive information regarding loading of the access points, associations between the access points and the terminals, target data rates of the terminals based on service demands of the terminals, actual data rates of the terminals, and signal strengths of the terminals with respect to access points within range;
  based on the received information, identify access points which fail to satisfy service demands of one or more of associated terminals as overloaded, access points which can provide service to one or more additional terminals as under-loaded, terminals whose service demands are not being met as unsatisfied, and terminals whose service demands are being met as satisfied;
  determine, for each overloaded access point, how many M among N unsatisfied terminals associated with the access point, where $N>=M>=1$, need to re-associate with an under-loaded access point in order that all N terminals are satisfied;
  find, for each possible set of M among the N unsatisfied terminals, an under-loaded access point with which every terminal in the set of M can be re-associated in order to satisfy all the N terminals; and
  instruct the M terminals to re-associate from the overloaded access point to the found under-loaded access point.

Thus, embodiments of this invention can provide a load balancing (LB) algorithm used for non operator-managed wireless networks but which may also be applied to an operator managed network. Due to the uneven distribution of traffic in the network, some APs or RATs are more congested than others. In order to balance the traffic distribution among different APs, the load balancing algorithm optimizes the association of terminals with different APs using the same or different RATs. Thus the network congestion problem is resolved and the QoE for all terminals in the network is improved.

Based on the optimization goal of reducing the number of unsatisfied terminals in the network with minimum number of re-associations, the proposed LB algorithm can benefit both the user terminals and mobile networks in terms of improving individual terminals' QoE, relieving network congestion and minimizing operational complexity.

BRIEF DESCRIPTION OF THE DRAWINGS

Reference is made, by way of example only, to the accompanying drawings in which.

DETAILED DESCRIPTION

An embodiment of the present invention will now be described by way of example, referring to a WLAN operating in accordance with any of the various 802.11 (Wi-Fi) standards, although it is to be understood that the present invention is also applicable to other types of wireless network operating on similar principles.

The proposed load balancing (LB) algorithm is based on the self organising network (SON) concept which is well-known for its advantages in optimizing the network performance automatically with minimum human intervention. The proposed LB algorithm is deployed in a centralized LB Server. In accordance with the present invention it will automatically reconfigure the active terminals' association patterns with different APs based on events and measurements generated by the active terminals.

Figure 1:
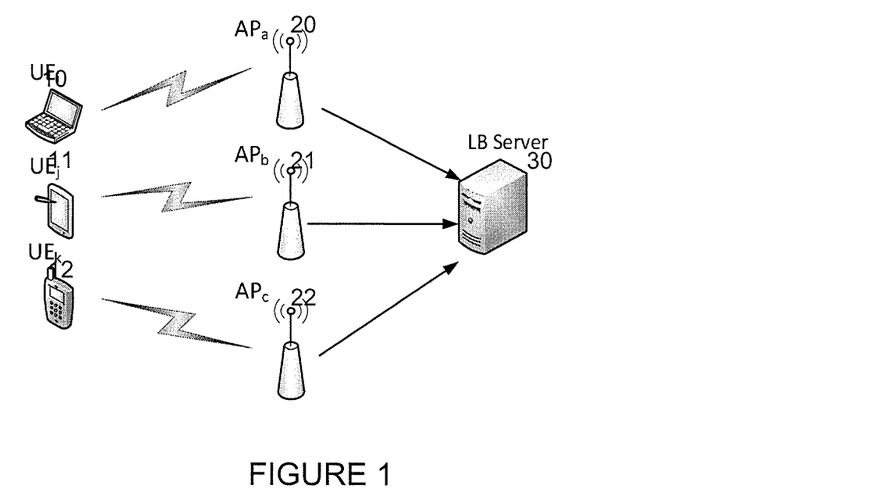
FIG. 1 shows the system architecture in an embodiment of the present invention.

FIG. 1 illustrates in simplified form the system architecture that the dynamic LB algorithm is based on. A more specific architecture will be described later with reference to FIG. 8.

A plurality of APs 20, 21 and 22 are deployed in a network to form overlapping hotspots within an enterprise, for example. A load balancing server 30 is connected to the APs by broadband cable for example (in practice, at least one network switch would be interposed between the load balancing server and APs). The load balancing server controls the WLAN at an enterprise level, for example. Thus, different networks would normally each have their own load balancing server. The load balancing server may have various functions apart from performing the method of the invention.

The concept of the centralized LB Server is similar to that of a SON server in the 3GPP context, but here the deployment of the LB Server is independent from the 3GPP core network, and it is designed to be plugged into an enterprise's existing WLAN (either locally or remotely) to carry out network optimization service for a specific enterprise. Therefore the LB Server is based on an enterprise network, not the core network of an operator and in this sense, is different from a SON server.

The load balancing server 30 gathers information from terminals 10, 11, and 12 through the radio link between each AP 20, 21 and 22 and terminals. As indicated in the Figure, the terminals may be of various types including a laptop PC 10, tablet computer 11, or mobile handset 12. These terminals will henceforth be referred to as "clients" or "UEs".

The AP may take the form of a wireless router or may be combined in another device, for example a Home eNB (HeNB) employed in an LTE wireless cellular system. Where several APs in a given area or building are connected to the same wired network, this is called a distribution system. An AP may also be provided by a suitably-equipped smart phone, which differs from conventional APs in that the connection to the backhaul network is wireless.

Firstly, it is assumed that the LB Server 30 is in communication with each of the terminals (via the APs) and gathers information about the terminals (and thus indirectly, about the APs). Whilst much of this information may be acquired from the terminals themselves, there is no specific need for the APs to be directly involved in the information-gathering process. In other words the information-gathering can be essentially transparent to the APs.

The information on actual data rates of the terminal, association between the terminal and its serving AP, scanning results of the terminal in terms of signal strengths with respect to different APs within the range is sent from the terminal to the LB Server. Alternatively, only the information on scanning results and association between the terminal and its serving AP is sent from the terminal, and the traffic information on actual data rates is obtained by the LB Server from somewhere in the network, such as by monitoring the packet information at a network switch (see 40 in FIG. 8). The information on target data rates of the terminals or different types of services is given by the network administrator, i.e. the policy control related information is provided by the administrator to the LB Server. The information on loading of individual APs can be calculated at the LB Server using the data rate information collected from individual terminals.

In the case where the information is collected from terminals, each participating terminal will need install a mobile application (described later) to enable the information transfer from the terminal to the LB Server; in the case that the information is collected from the network, application software is installed in the network device, e.g. in a network switch 40 (see below).

Information available at the LB Server can include: UE session information including the number of active sessions, session types (UDP, TCP or HTTP), UE downlink and uplink throughput information, UE signal strength information with respect to its serving and neighbouring APs, all such types of information being periodically sent by the UE to the LB Server. In addition, information on a QoS threshold for each UE or each UE's different session types is pre-configured by the enterprise's network administrator and stored in the LB Server. In this way, the LB Server is able to determine UEs which are "unsatisfied" or in other words experiencing poor QoE. This can be determined for example by comparing a UE's desired data throughput in terms of the QoS requirements of the services currently being provided, with the actual data throughput currently being achieved between that UE and its current AP.

There are three states defined for each UE, namely disconnected, connected and active. The following high level procedures are involved to enable the LB process:

(a) A UE is assumed to start in the disconnected state. When the UE enters a WLAN, it associates with an AP using a certain association criterion, for example, based on the strongest signal strength, after which it becomes connected;

(b) A connected UE transitions to active mode if it starts one or multiple data sessions. Thus, the UE is assumed to start at least one data session with the AP to which it first connects. The LB Server monitors the real-time network behaviour, active UEs' session types, data rates and signal strengths (in particular, signal strengths at the same UE from multiple APs). Depending on the UE's requirement on QoS for the session/sessions, the LB algorithm in the centralized server is triggered (or it may be invoked periodically), and the algorithm is performed to improve the QoE of UEs that are not satisfied with the QoS of their ongoing sessions.

(c) The new UE association pattern yielded from running the LB algorithm is instructed to the UEs that need to be re-associated with another AP.

(d) After receiving the instruction of re-association, the UEs select the newly instructed AP to re-associate with for improving the QoS of the ongoing sessions. If the LB algorithm has correctly calculated free capacity in the other AP, this can be done without impacting the performance of existing UEs attached to that AP.

(e) Operation in the WLAN proceeds on the basis of the new association pattern determined by the LB algorithm. Of course, UEs may join or leave the WLAN or change AP based on conventional criteria so that after a time, it becomes necessary to perform another iteration of the LB algorithm.

There are two fundamental processes involved in steps (a) to (d). One is the initial UE association process that turns the UE to connected mode; the other is the LB process that instructs an active UE to re-associate with another AP. The two processes take place in the WLAN depending on whether there are new UEs becoming connected and if there are any active UEs suffering from poor QoE. One possible way of operating the UE association process is in an aperiodic manner depending on the new UE arrival rate, and the ways to operate the LB process could either be in an aperiodic or periodic manner, or both (in other words, with periodic iterations of the method supplemented as required by aperiodic iterations triggered by changing conditions).

Figure 2:
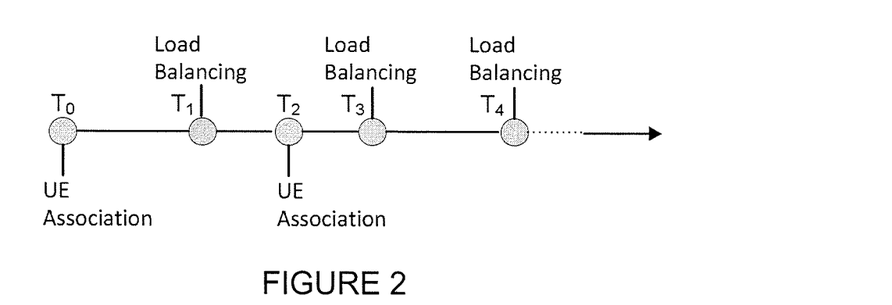
FIG. 2 shows the overall sequence of operation in a method embodying the invention.

FIG. 2 illustrates an example of the LB process being performed in the network in a periodic manner. The horizontal axis represents time, and at times $T_0$ and $T_2$ in this example, UE association takes place, whilst at times $T_1$, $T_3$ and $T_4$ the load balancing algorithm is applied.

Figure 3:
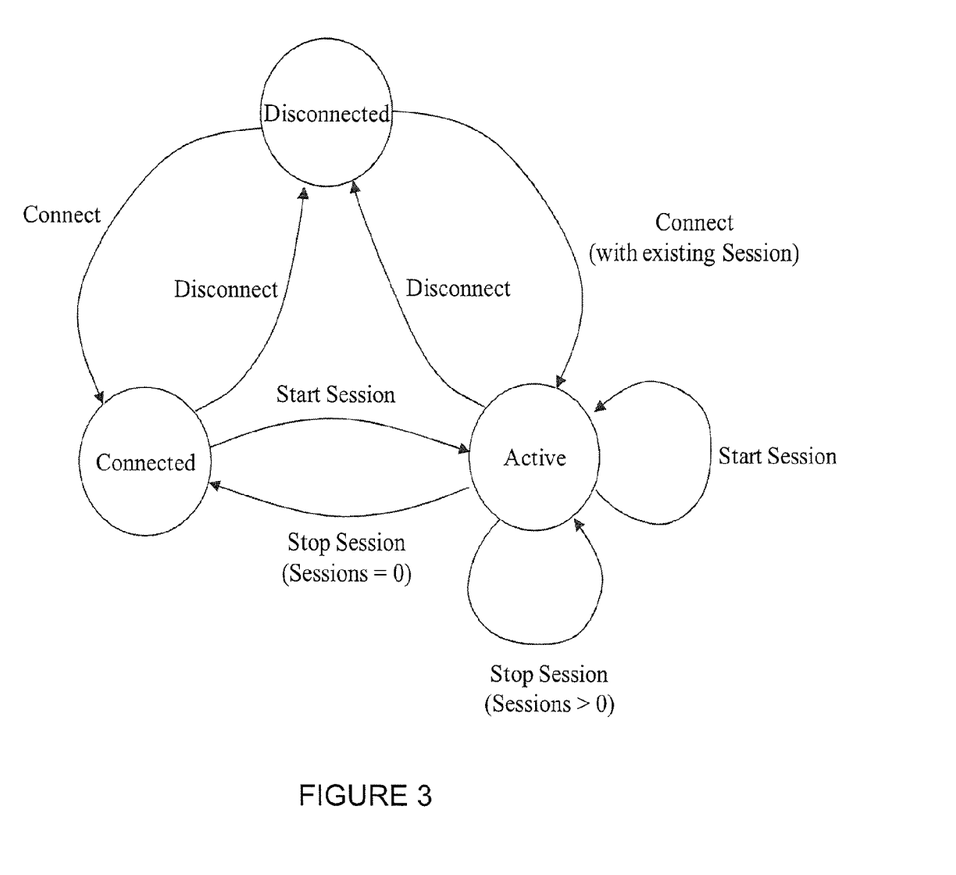
FIG. 3 shows the state machine of a terminal (client) in a WLAN.

The state machine of a UE is illustrated in FIG. 3, showing the possible transitions between disconnected, connected and active mode. The proposed LB process is carried out when a UE is in the active mode but suffering from poor QoE for its ongoing sessions. Therefore the proposed LB algorithm does not modify the initial association policies for the UE to become connected or associated.

As an AP becomes congested, an increasing number of associated UEs will start to experience difficulties in achieving an acceptable data rate. The key decision for the network is to determine which UEs should be moved and to which access points to optimise the overall network performance. The present invention addresses these points in the manner now to be described.

The assumptions made in the proposed algorithm to enable the network to overcome the overload problems are that:

(i) Any UEs that are experiencing poor QoE, termed unsatisfied UEs (for example because their QoS requirements in terms of data throughput, are not being met by the AP to which they are currently associated), can (in principle) be re-associated;

(ii) The UEs that are satisfied with their current QoE (for example because their current QoS requirements are being met) will not be re-associated;

(iii) The APs that have free capacity (regarded as under-loaded APs) do not move out their incumbent UEs to take over the unsatisfied UEs that need help. In other words the under-loaded access points do not change their existing associations but may accept re-associations from other UEs.

In order to enable the LB algorithm to make proper decisions on what actions to be taken in order to solve the overload problems, the reward and cost of performing the LB algorithm are defined as follows:

Reward:

the reward is minimizing the number of UEs in the WLAN that cannot get an acceptable quality of service (QoS), based on a minimum requirement of QoS of each service type. Such UEs are also referred to as "unsatisfied" UEs.

Cost:

the cost is regarded as the number of UEs that require re-association; in other words need to be offloaded or "moved out" from one AP to another.

Based on these reward and cost definitions, the optimization goal of the proposed LB algorithm is to minimize the number of UEs that cannot get an acceptable QoS whilst carrying out the minimum number of re-associations in the network. The rationale behind the proposed optimization goal is that performing UE re-associations involves signalling overhead and short term interruptions to the UE's ongoing services. Therefore the proposed LB algorithm aims at reducing the number of unsatisfied UEs in the network with minimum operational cost.

In the description which follows, it is also assumed that APs that are close to each other operate on orthogonal channels (in other words, that the WLAN distribution system is a well planned network). Therefore there is no co-channel interference considered in the optimization model.

Proposed Load Balancing Algorithm

Figure 4:
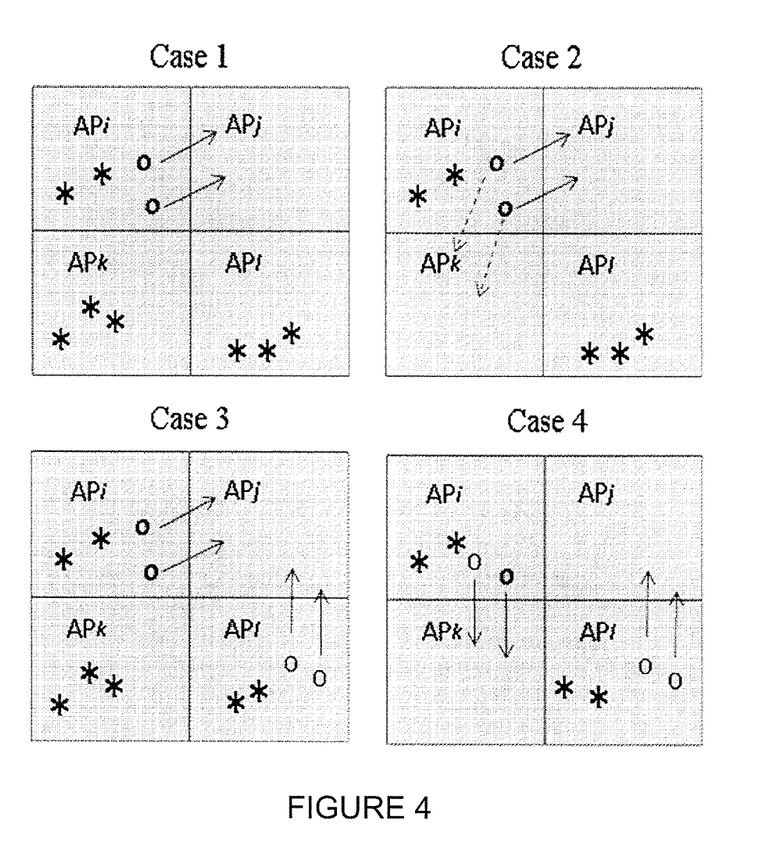
FIG. 4 illustrates various network scenarios which can be addressed by the method of the invention.

FIG. 4 schematically shows some possible network scenarios, classified into four general cases based on the number of unsatisfied UEs and under-loaded APs and their distributions in the network. In each case, the open circles represent the unsatisfied UEs in the APs. The rectangles are used for illustration purposes, each of which represents the coverage area of an AP. The UEs contained in a rectangle are the ones that are currently associated with the AP in the same rectangle, but each UE can detect radio signals from the other neighbouring APs. It is assumed that communication takes place only between each UE and one AP with which it is currently associated.

In case 1, there are multiple unsatisfied UEs in the same AP, and there is only one under-loaded AP in the WLAN that can offer offloading help. In case 2, there are multiple unsatisfied UEs currently associated with the same AP, and there are multiple under-loaded APs in the network that can offer offloading help. In case 3, there are multiple unsatisfied UEs distributed in (i.e. associated with) different APs, and there is only one under-loaded AP in the network that can offer offloading help. In case 4, there are multiple unsatisfied UEs associated with different APs, and there are multiple under-loaded APs in the network that can offer offloading help.

Although there are various network scenarios, the proposed LB algorithm is a generic algorithm that can be applied in the four different kinds of scenarios. However, depending on the network scenarios, some procedures in the proposed algorithm could be neglected when the algorithm is applied.

First of all, the definitions and calculation methods of the key parameters used by the algorithm are given.

Definitions and Calculation Methods of Key Parameters $C_{free}(AP_i)$: Free bandwidth available in an AP.

This can be obtained by calculating the difference between the maximum achievable capacity of an AP and the total sum of the downlink (DL) and uplink (UL) throughputs of all the active UEs that use the AP.

One possible way to derive the maximum achievable capacity of an AP is the historical data of system throughput collected from the network at the LB Server. The maximum throughput provided by an AP to its associated UEs is taken as the AP's maximum achievable capacity, which needs to be updated by a new higher throughput value when it occurs. The maximum achievable capacity is derived from the analysis on historical data collected from the network, therefore it is known to the LB Server.

The maximum achievable capacity depends on a lot of factors, such as distance to UEs and equipment types of UEs, therefore using the historical information on maximum throughput supported by the AP can take all these factors into account.

Due to the underlying contention based medium access mechanism in WiFi, even if the total sum of throughput of the AP appears to be below its maximum capacity, the AP may already be in overloaded status, therefore in order to ensure the AP is genuinely under-loaded, the following round trip time (RTT)-based method is used to further check if there is any free capacity available in the AP.

$C_{free}(AP_i)$ Calculation Method

First, determine:

$RTT_{reference}(AP_i)$: the round trip time (RTT) of $AP_i$ that corresponds to its maximum throughput;

$RTT(AP_i,T_n)$: the measured RTT of $AP_i$ over the time period $T_n$;

$C_{max}(AP_i)$: the maximum achievable throughout of $AP_i$;

$C_{sum}(AP_i)$: the total sum of data rates to/from all the active UEs connected with $AP_i$;

Secondly, check if $AP_i$ has any unsatisfied UEs associated with it, and if not, go to Thirdly; if so, $AP_i$ is flagged as "Overloaded", and $C_{free}(AP_i)=0$;

Thirdly, the calculation method using the parameters mentioned in First is:

Calculate $C_{sum}(AP_i)$ using the downlink and uplink data rates collected at the DCM server;

If $C_{sum}(AP_i)=0$, $C_{free}(AP_i)=C_{max}(AP_i)$;

If $C_{sum}(AP_i)<C_{max}(AP_i)$ and $C_{sum}(AP_i)\neq 0$,

If $RTT(AP_i,T_n)<RTT_{reference}(AP_i)$, $C_{free}(AP_i)=C_{max}(AP_i)-C_{sum}(AP_i)$;

If $RTT(AP_i,T_n)\geq RTT_{reference}(AP_i)$, $AP_i$ is flagged as "Overloaded", $C_{free}(AP_i)=0$;

If $C_{sum}(AP_i)=C_{max}(AP_i)$, $AP_i$ is flagged as "Overloaded", $C_{free}(AP_i)=0$;

$C_{free}(UE_i,AP_i)$: Bandwidth freed up by moving out $UE_i$ from $AP_i$.

This is based on the measured traffic to/from a UE.

$C_{req}(UE_i,AP_j)$: Bandwidth required by $UE_i$ from an $AP_j$ with which the UE is to newly associate.

This is based on the type of sessions currently active in the UE, e.g. video streaming, Web browsing, VoIP etc. The actual values could be based on subscription levels for each UE set by the network owner.

$N_{nes}(AP_i)$: Minimum number of unsatisfied UEs which need to be re-associated (moved to another AP) to resolve the bandwidth shortage problem of $AP_i$.

This parameter (also called Min re-associated UE count, and labelled M in the claims) refers to the fact that for example there may be 5 unsatisfied UEs connected to an access point but it may be sufficient to move 2 UEs, as the bandwidth freed by re-associating these can enable the remaining unsatisfied UEs to achieve their bandwidth thresholds. In other words, M<=N where N is the number of unsatisfied UEs connected to the same AP.

This potentially gives the minimum cost for each overloaded AP. The method for calculating the value of $N_{nes}(AP_i)$ is as follows:—

$N_{nes}(AP_i)$ Calculation Method

First of all, rank all the unsatisfied UEs in $AP_i$ in the descending order of $C_{free}(UE_i,AP_i)$, and save them in a set $S_{des}(AP_i)$;

Secondly, define a temporary UE set ($S_{temp}(AP_i)$) to calculate the minimum number of UEs that require re-associations.

Initialization: $S_{temp}(AP_i)=\phi$;

Loop through UEs in set $S_{des}(AP_i)$, and in each loop add one UE to $S_{temp}(AP_i)$, Calculate the total sum of bandwidth freed up by moving out UEs in $S_{temp}(AP_i)$, i.e.

$C_{sum-free}(S_{temp}(AP_i))=\Sigma B_{cur}(UE_i,AP_i)$, where $B_{cur}(UE_i, AP_i)$ is the bandwidth currently being used by $UE_i$ at $AP_i$, the summation range is from 1 to the number of UEs in $S_{temp}(AP_i)$;

Check if the following condition is satisfied:

$C_{sum-free}(S_{temp}(AP_i))\geq C_{sum-req}(S_{sup}(AP_i))$, where set $S_{sup}(AP_i)$ comprises the unsatisfied UEs at $AP_i$ that are not contained in $S_{temp}(AP_i)$ and $C_{sum-req}(S_{sup}(AP_i))$ is calculated as follows:

$$C_{sum-req}(S_{sup}(AP_i))=\Sigma[B_{tar}(UE_n,AP_i)-B_{cur}(UE_n,AP_i)] \quad (1)$$

In (1), $B_{tar}(UE_n,AP_i)$ represents the target bandwidth of a UE, and the summation range is from 1 to the number of UEs in $S_{sup}(AP_i)$:

If so, stop the loop and record the number of UEs in set $S_{temp}(AP_i)$ and use it as $N_{nes}(AP_i)$;

Otherwise, go to the next iteration.

In the above calculation, it is possible to rank the UEs because the LB Server stores all the information related to a UE, and the LB Server identifies a UE based on its MAC address which is sent by the UE to the LB Server. After the UE being identified by the LB Server, all the information relevant to the UE is sent to and stored in the LB Server, which is then used to judge whether the UE is an unsatisfied UE or not.

It will be noted that if no under-loaded APs can be found to accommodate the $N_{nes}(AP_i)$ unsatisfied UEs of $AP_i$, then the algorithm leaves these unsatisfied UEs alone in this optimization interval.

$S_{all}(N_{nes}(AP_i))$: sets of UEs identifying specific UEs.

For each AP, we calculate the potential UE combinations that satisfy this minimum re-associated UE criterion and record the combinations in the collection. There may be a number of combinations of users at an access point that meet this minimum criterion. For example, if the minimum number is 2, and there are 5 unsatisfied UEs, then it is necessary to re-associate 2 of the 5 unsatisfied UEs, there could be more than one combination that are composed of 2 UEs and can free up sufficient capacity for the remaining unsatisfied UEs at the same AP to use. Henceforth, each UE combination is termed a UE set. Note that membership of the sets may be overlapping (in other words the same UE may be in more than one set).

$SNR_{avg}(S_a(N_{nes}(AP_i)),AP_j)$: Average SNR between a UE set and an AP

This is based on the SNR averaged over the SNR values between each UE in set $S_a(N_{nes}(AP_i))$ and $AP_j$.

$\gamma(S_a(N_{nes}(AP_i)))$: Re-association efficiency factor for each $AP_i$

This is defined as the ratio between the number of recovered UEs (that is, UEs whose QoE demands are satisfied by application of the algorithm) and the number of re-associated UEs. For example if there are 5 unsatisfied UEs at $AP_i$ and 2 of them are re-associated with another AP, then the factor is 5/2. This factor is referred to in the claims as N/M where there are N unsatisfied UEs, of which M are to be re-associated. In other words, the sets are any combination of M UEs out of N connected to the same AP.

Figure 5:
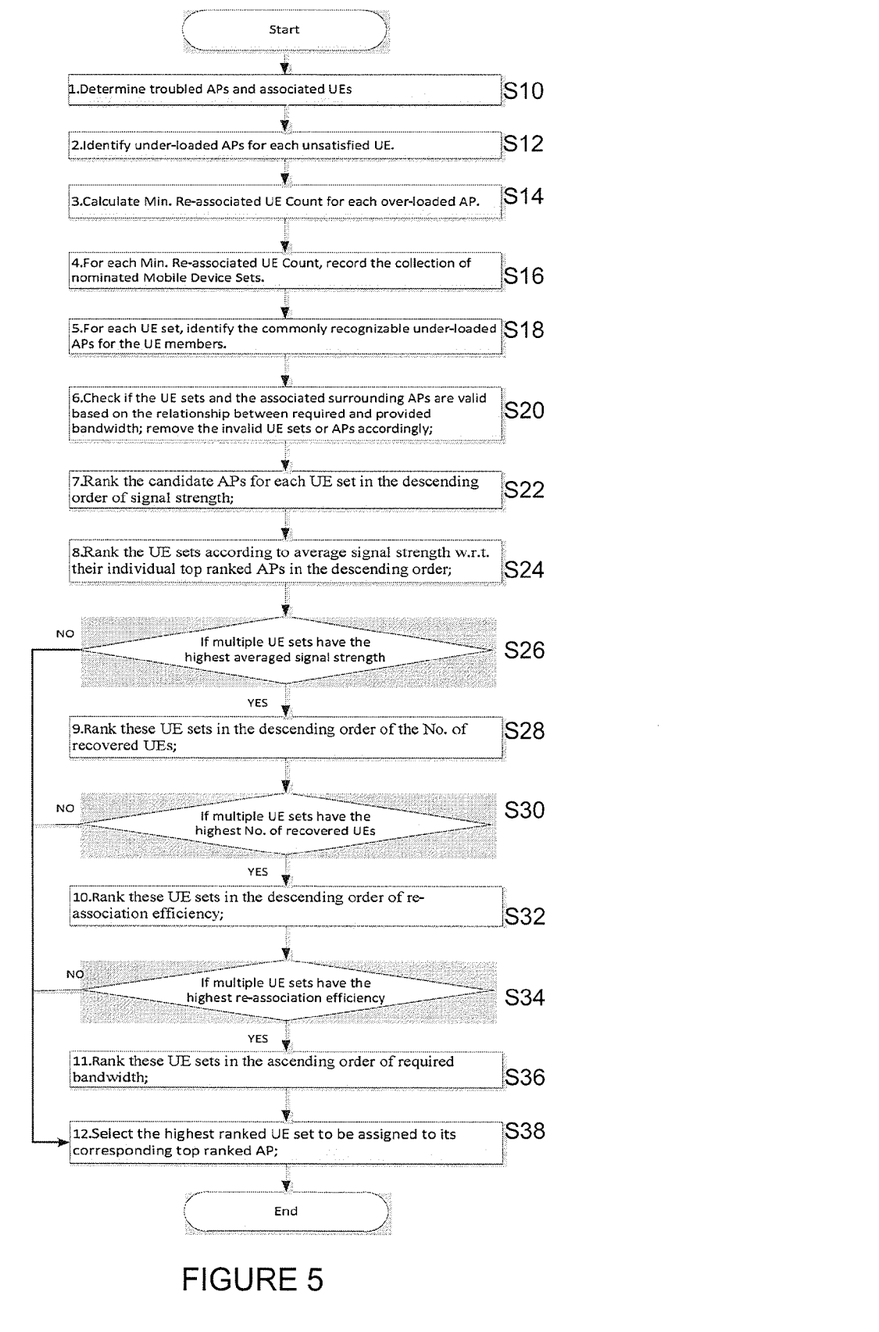
FIG. 5 is a detailed flowchart of a load balancing (LB) algorithm employed in a method of the invention.

In this example, the LB algorithm operates periodically in the network. At each iteration, or operational interval, a UE set (with one or multiple UEs) is selected to be re-associated with one under-loaded AP. The sequence of steps S10-S38 is shown in the flowchart of FIG. 5, and the detailed procedures for selecting the under-loaded AP and the UE set are given as follows.

S10: Determine the troubled APs (those with unsatisfied UEs) and the associated unsatisfied UEs:

If an AP has n (n≥1) unsatisfied UEs, then the AP is considered as an overloaded or troubled AP. To identify an unsatisfied UE, the calculation is done at the LB Server based on the comparison between a UE's current data rate and its target data rate. The current data rate of a UE is explicitly reported from the UE, and the target data rate is pre-configured by for example the enterprise network's administrator and stored in the LB Server.

S12: Identify the under-loaded APs that are surrounding each unsatisfied UE based on signal strength. Here, "surrounding" means within range of the UE. The LB Server saves a signal strength threshold for the UE's detected signal strengths to compare with. If the detected signal strength of an AP is below the threshold, the AP is not considered as a "surrounding" AP of the UE.

S14: Calculate the Min re-associated UE count ($N_{nes}$($AP_i$)) for each of the overloaded APs.

S16: For each of the overloaded APs, find sets of specific UEs, each set having a number ($N_{nes}$($AP_i$)) of UEs (=M in the claims) that can be used as options to be re-associated by the collection of Mobile Device Sets $S_{all}$($N_{nes}$($AP_i$)). Individual UEs within these sets may be distinguished by their MAC addresses for example.

S18: For each UE set, identify the commonly recognizable under-loaded APs for the user members in a set as each UE set's surrounding under-loaded APs. Thus, this only considers the under-loaded APs within range of all members of a set. Note that some sets may have to be ruled out because no suitable APs are found. If no under-loaded APs are found within range of the UE set, then the UE set is removed from the collection of Mobile Device Sets.

S20: For each overloaded AP, and for each nominated set in the collection of remaining valid Mobile Device Sets, check if each surrounding AP (by itself) has enough free bandwidth to accommodate it, if so, keep the UE set and the surrounding AP in the collection of Mobile Device Sets and candidate AP list for the UE set respectively; if there are not any surrounding APs that have enough free bandwidth for the UE set, remove the UE set from the collection. If all the collections of Mobile Device Sets are empty, exit the process. The assumption here is to use only one under-loaded AP on which to offload all UEs in the set.

S22: Rank the candidate APs for each UE set in the descending order of average signal strength.

S24: Rank the UE sets according to average signal strength with respect to their individual top ranked APs in the descending order, and select the highest ranked UE set to be assigned to its corresponding top ranked AP, so that both the UE set and the under-loaded AP chosen to be considered at this time interval are determined.

Depending on the complexity of the network, the steps described so far may suffice to determine one UE set for re-association, and conclude this iteration of the algorithm. However, if there are multiple sets having equivalent signal strength, further processing may be performed to decide among the sets, as follows.

S26: If there are multiple UE sets that have the highest rank in step S24, (S26, "YES") then in S28, rank these UE sets in the descending order of the number of recovered UEs (i.e. UEs brought to a "satisfied" state), and select the UE set that has the highest rank to be allocated to its corresponding top ranked AP.

S30: If there are multiple UE sets that have the highest rank in S28 (S30, "YES"), then in S32, rank these UE sets in the descending order of re-association efficiency, and select the UE set that has the highest rank to be allocated to its corresponding top ranked AP.

S34: If there are multiple UE sets that have the highest rank in step 10 (S34, "YES"), then in S36, rank these UE sets in the ascending order of required bandwidth.

S38: Finally, select the UE set that has the highest rank in S36 to be allocated to its corresponding top ranked AP.

As will be apparent from the above, steps S16-S38 involve all the overloaded AP's unsatisfied UE sets. Ranking is performed among all the unsatisfied UE sets distributed in potentially multiple overloaded APs. Steps S10-S14 also involve all the overloaded APs and their associated unsatisfied UE sets.

At each optimization interval, after the optimization process being performed, the unsatisfied UE set that wins all the ranking is selected to be accommodated by one suitable under-loaded AP. The other unsatisfied UE sets, associated with other overloaded APs, will be optimized in later iterations.

Load Balancing Server

Figure 6:
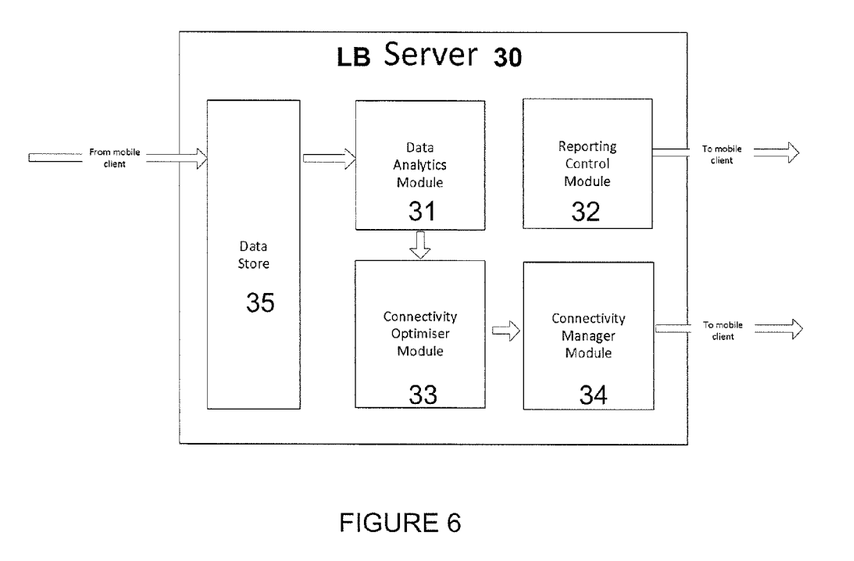
FIG. 6 shows functional blocks of a LB Server.

FIG. 6 shows one possible configuration of the LB Server 30, in which the key elements include data storage, data analytics and device control.

Data Store 35: this stores all information received from the mobile terminals including, but not limited to; device session information (real-time streaming, FTP, web browsing etc), device signal strengths with respect to neighbouring APs, device traffic monitor details (Transmit/Received bytes) and general network overview information such as which devices are associated and which have active sessions. The data store 35 also records the information gathered about the network, including for example historical data on throughput of each AP.

Data Analytics Module 31: this module allows for the data to be inspected, filtered, transformed, and modelled with the goal of highlighting useful information, suggesting conclusions, and supporting decision making within the Connectivity Optimiser Module.

Connectivity Optimiser Module 33: this module includes algorithms for selecting which AP and/or RAT each device should connect to by considering the requirements of applications being used. The module should also minimize AP/Femto congestion and reduce device power consumption by for instance, deactivating a specific radio when it's not being used for data communication.

Connectivity Manager Module 34: this module is responsible for communicating any network reconfiguration changes to the device itself. This may include a change from one BSSID to another BSSID, or a change from one RAT to another.

Reporting Control Module 32: this module is used to control whether a device is required to report performance/ usage statistics to the server. Other information regarding the content and periodicity of the reports should also be controlled through this module.

The load balancing server 30 may of course be provided by a suitably-programmed server (for example the server in a software-defined network as mentioned earlier) and therefore the functional units shown need not correspond to discrete hardware units.

Mobile Application

Figure 7:
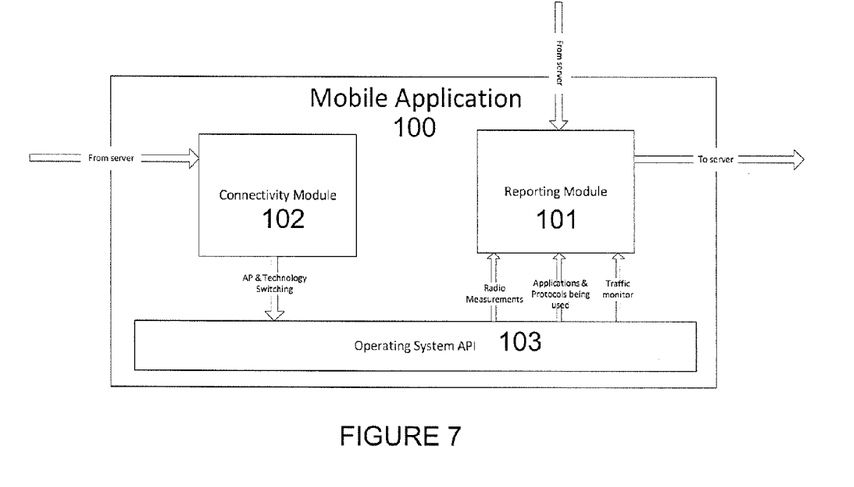
FIG. 7 shows functional blocks of a mobile application intended to be run by a terminal.

FIG. 7 shows functional blocks of a Mobile Application 100 which is a software application (or "app") to be downloaded and run on each participating terminal 10, 11 or 12. From FIG. 7 it can be seen that there are two key components of the application which will interact with the device's operating system (through the developer's API).

Reporting Module 101: the reporting module interacts with the Operating System via an Operating System API 103, by collecting key statistics from the device which will then be sent to the LB Server 30. Information such as (but not limited to), signal strengths from APs in range, Applications/services/protocols being used by the device, and the number of bytes being received and transmitted by the LB Server 30. This information is sent periodically to the LB Server which in turn helps create a real-time picture of the network. The reporting module 101 will also receive reporting commands from the LB Server indicating related parameters, such as but not limited to, periodicity of reports, trigger to start or stop reporting, and content/type of reports.

Connectivity Module 102: this module is responsible for receiving commands from the LB Server 30. These commands will generally instruct the terminal to re-associate with a different AP (and if necessary to switch to a different RAT). This module also interacts with the Operating System of the terminal through the developer's API 103.

Figure 8:
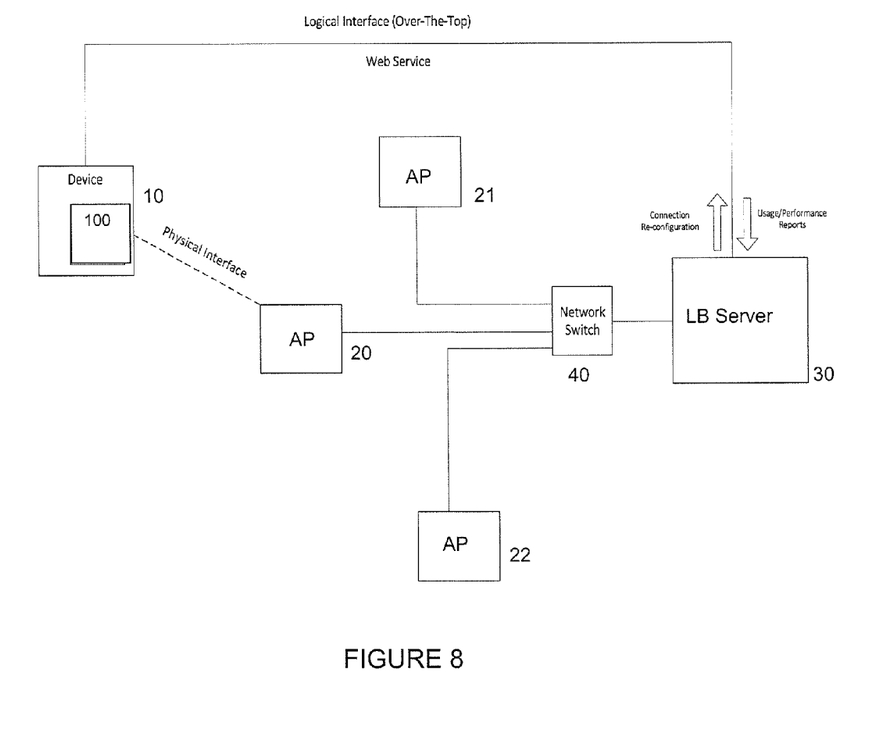
FIG. 8 shows the overall system architecture with a logical interface between terminals and the LB Server.

FIG. 8 shows an overall system architecture in which, as already mentioned with respect to FIG. 1, the terminals (in this case exemplified by a single device 10) communicate via APs 20, 21 and 22 which are in turn connected to the LB Server 30, Typically (though this is not essential) at least one Network Switch 40 will be interposed between the APs and the LB Server. Although physically, wireless signals are transmitted from the device 10 to the AP 20 with which it is associated, and pass from the AP 20 (via the Network Switch 40) to the LB Server 30, the AP does not interfere with this communication. Thus, as shown in FIG. 8, a logical interface exists between the device 10 (more particularly the Mobile Application 100) and the LB Server 30. By making this logical interface a web service interface, the communications between Mobile Application 100 and LB Server 30 can run over the top of the network infrastructure in a hardware-independent manner.

In order to establish a web service connection with the LB Server 30, the device 10 must already have an IP address (usually assigned through DHCP). This stage therefore requires the device 10 to associate with an appropriate AP as per the protocol defined by the respective technology (e.g. Wi-Fi). Once connected, the LB Server can then begin receiving information from the Mobile Application, and controlling the wireless connectivity of the device.

As mentioned previously, when connecting to a wireless network the default choice for a terminal is to associate with an AP based on signal strength. However, by utilising the operating system's API this behaviour can be changed by providing a LB Server to a Mobile Application residing on the terminal. Terminals send back information to the LB Server which in turn allows a real-time picture of the network to be created which can then be used to optimise the connectivity of each terminal. To alter the connectivity within a terminal, the server will simply send a command to the Mobile Application instructing the terminal to terminate its current connection and to re-associate with a different, specified AP.

Various modifications are possible within the scope of the present invention.

Although the described embodiment has been explained with respect to Wi-Fi, this is only an example of a WLAN standard suitable for applying the present invention.

Although not directly applicable to other RATs such as LTE or WiMAX, the present invention nevertheless is useful in a multi-RAT environment, where it may be desired to offload as much data traffic as possible from a cellular network to the WLAN.

In general, where an optimal solution is sought a suboptimal choice may nevertheless be made if other needs demand it, without departing from the principles of this invention.

For example, whilst steps S26-S38 in the flowchart in FIG. 5 specify detailed mechanisms for selecting between UE sets and/or under-loaded access points suitable for re-association, these mechanisms are not essential. It would be possible at any stage to select between UE sets and/or under-loaded access points at random, or in order of time since previous selection for re-association, or in some other manner which does not necessarily yield optimal results.

To summarise, embodiments of this invention provide a load balancing method in a WLAN having access points 20, 21, 22 each providing service to terminals 10, 11, 12 which are within range of the access points and associated with the access points, the method comprising identifying (S10, S12 in FIG. 5) overloaded access points, unsatisfied terminals and under-loaded access points; determining (S14), for each overloaded access point, how many M among N unsatisfied terminals associated with the access point, where N>=M>=1, need to re-associate with an under-loaded access point in order to satisfy all the unsatisfied terminals associated with the access point; constructing (S16), for each overloaded access point, one or more sets of M unsatisfied terminals; and finding (S18-S38), for each overloaded access point and each set of M unsatisfied terminals, an under-loaded access point with which every terminal in the set of M can be re-associated in order to satisfy all the N unsatisfied terminals associated with the overloaded access point. The load balancing method may be carried out by a LB Server 30 applied to an enterprise-wide WLAN. A Mobile Application is preferably implemented on each terminal for information-gathering purposes.

The method can be used for non operator-managed wireless networks but may also be applied to an operator managed network. Due to the uneven distribution of traffic in the network, some APs or RATs will be more congested than others. In order to balance the traffic distribution among different APs, the load balancing algorithm optimizes the association of UEs with different APs using the same or different RATs. Thus the network congestion problem is resolved and the QoE for all UEs in the network is improved.

INDUSTRIAL APPLICABILITY

Based on the optimization goal of reducing the number of unsatisfied UEs in the network with minimum number of re-associations, the proposed LB algorithm can benefit both the user terminals and mobile networks in terms of improving individual UE's QoE, relieving network congestion and minimizing operational complexity.

The invention claimed is:

1. A load balancing method in a wireless network having a plurality of access points each providing service to terminals within range of the access points and associated with the access points, the method comprising:
   (a) identifying overloaded access points, unsatisfied terminals and under-loaded access points by
      (ai) identifying an access point as overloaded if the access point fails to satisfy service demands of one or more of its associated terminals;
      (aii) identifying a terminal associated with an overloaded access point as unsatisfied if its service demand is not being satisfied; and
      (aiii) identifying an access point as an under-loaded access point if it can provide service to one or more additional terminals;
   (b) determining, for each overloaded access point, how many M among N unsatisfied terminals associated with the access point, where N>=M>=1, need to re-associate with an under-loaded access point in order to satisfy all the unsatisfied terminals associated with the access point;
   (c) constructing, for each overloaded access point, one or more sets of M unsatisfied terminals; and
   (d) finding, for each overloaded access point and each set of M unsatisfied terminals constructed in (c), an under-loaded access point with which every terminal in the set of M can be re-associated in order to satisfy all the N unsatisfied terminals associated with the overloaded access point.

2. The method according to claim 1 wherein (d) further comprises finding candidate access points for re-association by:
   (di) checking, for each set constructed in (c) and for each under-loaded access point, whether every terminal in the set of M unsatisfied terminals is within range of the under-loaded access point, and
   (dii) checking whether the under-loaded access point has sufficient capacity to satisfy every terminal in the set of M;
   and if both checks are positive, marking the under-loaded access point as a candidate access point.

3. The method according to claim 2 further comprising:
   (ei) for each set constructed in (c), if there is only one candidate access point for that set, selecting that candidate access point as a target access point for re-association, or if there is more than one candidate access point for that set, selecting, as a target access point for that set, the candidate access point of highest signal strength for the terminals in the set; and
   (eii) if there is only one set constructed in (c), re-associating that set with its target access point, or if there is more than one set constructed in (c), re-associating with its target access point the set having highest signal strength from its target access point.

4. The method according to claim 3 further comprising:
   (eiii) if there is more than one set of M unsatisfied terminals with equal highest signal strength in (eii), ranking those sets in descending order of N and if there is one set of largest N, re-associating that set with its target access point.

5. The method according to claim 4 further comprising:
   (eiv) if there is more than one set of largest N in (eiii), ranking those sets in descending order of efficiency ratio N/M, and if there is one set of highest efficiency ratio, re-associating that set with its target access point.

6. The method according to claim 5 further comprising:
   (ev) if there is more than one set of equal efficiency ratio in (eiv), ranking those sets in ascending order of capacity required by the M unsatisfied terminals which need to re-associate; and re-associating with its target access point the set of least capacity required.

7. The method according to claim 1 wherein iterations of the method are performed periodically during operation of the wireless network.

8. The method according to claim 7 further comprising excluding an overloaded access point from further consideration in the current iteration of the method if no under-loaded access point can be found in (d).

9. The method according to claim 1 wherein an iteration of the method is triggered by detecting that more than a threshold number of access points are failing to satisfy service demands of associated terminals, and/or that service demands of more than a threshold number of terminals are not being satisfied.

10. A load balancing server connected to a plurality of access points of a wireless area network, the access points providing service to terminals within range of, and associated with, the access points, the server arranged to:
    receive information regarding loading of the access points, associations between the access points and the terminals, target data rates of the terminals based on service demands of the terminals, actual data rates of the terminals, and signal strengths of the terminals with respect to access points within range;
    based on the received information, identify access points which fail to satisfy service demands of one or more of associated terminals as overloaded, access points which can provide service to one or more additional terminals as under-loaded, terminals whose service demands are not being met as unsatisfied, and terminals whose service demands are being met as satisfied;
    determine, for each overloaded access point, how many M among N unsatisfied terminals associated with the access point, where N>=M>=1, need to re-associate with an under-loaded access point in order that all N terminals are satisfied;
    find, for each possible set of M among the N unsatisfied terminals, an under-loaded access point with which every terminal in the set of M can be re-associated in order to satisfy all the N terminals; and
    instruct the M terminals to re-associate from the overloaded access point to the found under-loaded access point.

11. Non-transitory computer-readable recording media storing computer-readable code which, when executed by a processor of a computer connected to access points of a wireless network, causes the computer to perform functions of:
    (a) identifying overloaded access points, unsatisfied terminals and under-loaded access points by
       (ai) identifying an access point as overloaded if the access point fails to satisfy service demands of one or more of its associated terminals;
       (aii) identifying a terminal associated with an overloaded access point as unsatisfied if its service demand is not being satisfied; and
       (aiii) identifying an access point as an under-loaded access point if it can provide service to one or more additional terminals;
    (b) determining, for each overloaded access point, how many M among N unsatisfied terminals associated with the access point, where N>=M>=1, need to re-associate with an under-loaded access point in order to satisfy all the unsatisfied terminals associated with the access point;

(c) constructing, for each overloaded access point, one or more sets of M unsatisfied terminals; and (d) finding, for each overloaded access point and each set of M unsatisfied terminals constructed in (c), an under-loaded access point with which every terminal in the set of M can be re-associated in order to satisfy all the N unsatisfied terminals associated with the overloaded access point.

12. A wireless communication system comprising a plurality of terminals; a plurality of access points providing service to terminals within range of, and associated with, the access points; and a load balancing server connected to the access points, the server arranged to:

receive information regarding loading of the access points, associations between the access points and the terminals, target data rates of the terminals based on service demands of the terminals, actual data rates of the terminals, and signal strengths of the terminals with respect to access points within range;

based on the received information, identify access points which fail to satisfy service demands of one or more of associated terminals as overloaded, access points which can provide service to one or more additional terminals as under-loaded, terminals whose service demands are not being met as unsatisfied, and terminals whose service demands are being met as satisfied;

determine, for each overloaded access point, how many M among N unsatisfied terminals associated with the access point, where N>=M>=1, need to re-associate with an under-loaded access point in order that all N terminals are satisfied;

find, for each possible set of M among the N unsatisfied terminals, an under-loaded access point with which every terminal in the set of M can be re-associated in order to satisfy all the N terminals; and instruct the M terminals to re-associate from the overloaded access point to the found under-loaded access point.

* * * * *